United States Patent [19]

Honore et al.

[11] 3,899,769
[45] Aug. 12, 1975

[54] METHOD OF AND APPARATUS FOR REPRESENTING THE MOVEMENT OF A MOVING BODY IN A TWO-DIMENSIONAL SPACE

[75] Inventors: Etienne Augustin Henri Honore, Chatenay Malabry, France; Emile Leon Gabriel Torcheux, deceased, late of Paris, France; by Micheline Marie Torcheux, born Deloffre, heir, Paris, France; Alain Torcheux, heir, Paris, France; Adeline Geret, born Torcheux, heir, Paris, France

[73] Assignee: Societe d'Etude et d'Application des Techniques Nouvelles NEO-TEC, France

[22] Filed: June 25, 1973

[21] Appl. No.: 373,555

[30] Foreign Application Priority Data
June 27, 1972 France ........................ 72.23193

[52] U.S. Cl. ............................ 340/24; 343/5 EM
[51] Int. Cl. ..................... G08c 21/00; G01s 7/22
[58] Field of Search ............... 340/24, 27 NA, 29; 343/5 ER, 5 EM, 13 R, 11 R, 5 PP; 235/61 NV

[56] References Cited
UNITED STATES PATENTS
| | | | |
|---|---|---|---|
| 3,646,557 | 2/1972 | Scheer | 343/5 EM |
| 3,688,252 | 8/1972 | Thompson | 340/24 |
| 3,717,873 | 2/1973 | Riggs | 343/5 EM |

*Primary Examiner*—Thomas A. Robinson
*Attorney, Agent, or Firm*—Alan H. Levine

[57] ABSTRACT

The movement of a vessel in two dimensions is represented on a cathode ray tube screen by storing pairs of co-ordinates representing firstly the positions of reference points, secondly the current position of the body and thirdly a limited number of past positions of the body, extracting in succession pairs of co-ordinates of the three types, producing relative position information representing the difference between the co-ordinates of each two types, and applying analogue signals derived from the relative position information to control the position of the spot on the cathode ray tube screen.

9 Claims, 6 Drawing Figures

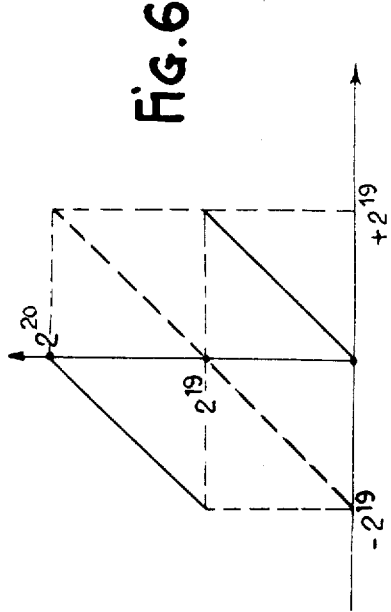
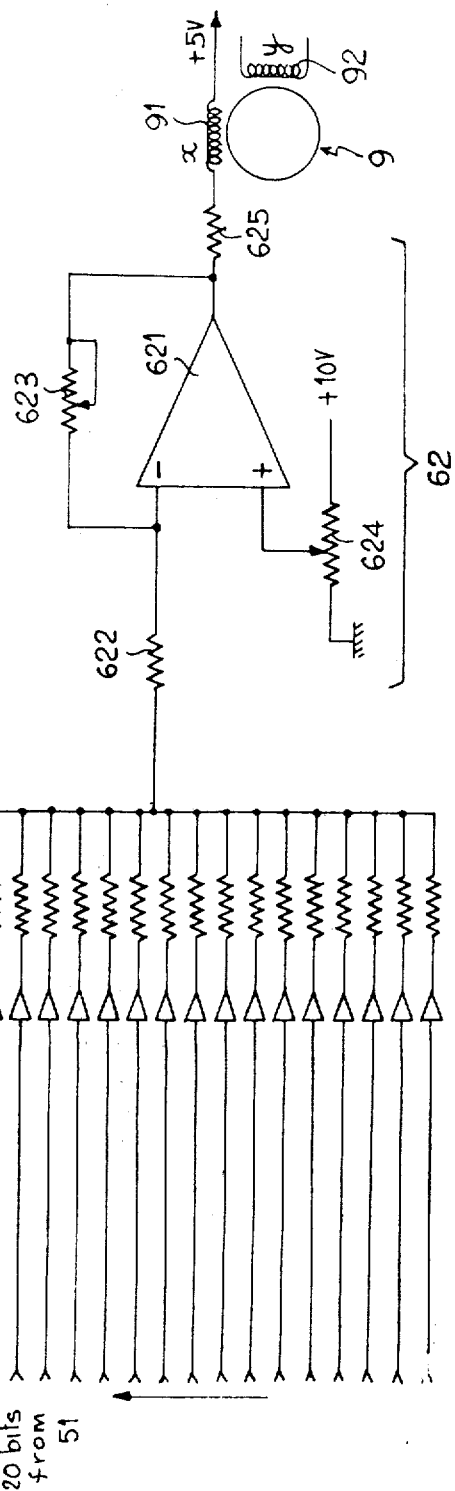
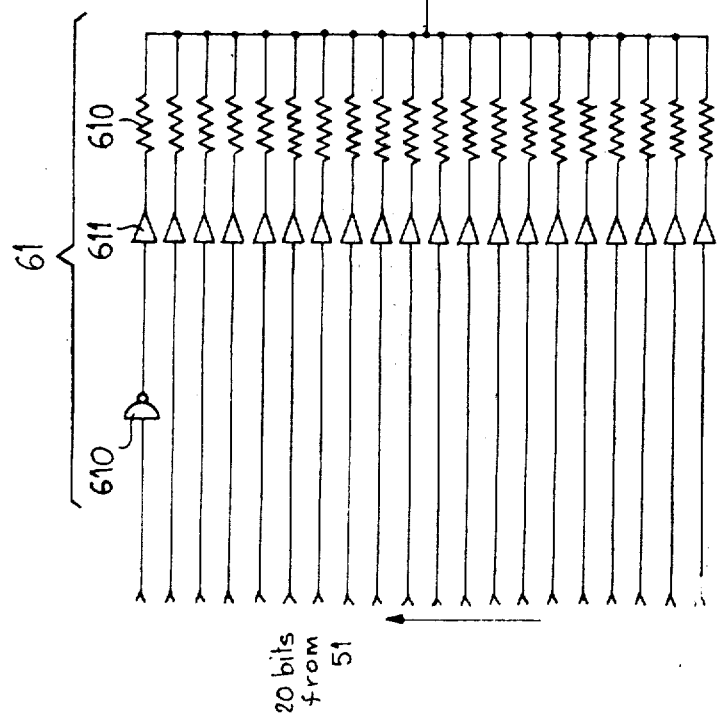
FIG. 6
FIG. 4

METHOD OF AND APPARATUS FOR REPRESENTING THE MOVEMENT OF A MOVING BODY IN A TWO-DIMENSIONAL SPACE

The present invention relates to the representation of a plurality of items of two-dimensional position information for visually displaying the movement of a moving body.

It is known that, generally speaking, many movements are regarded as being two-dimensional. In particular, movements on the surface of the earth are regarded as plane movements when they concern an area of small extent with respect to the geoid. It is likewise common, when considering the movement of an aircraft, to relate the position thereof to a system of co-ordinates define at the surface of the earth, disregarding the altitude. Moreover, the movement of an aircraft in a vertical plane at the moment of landing or take-off can be observed.

A movement referred to a two-dimensional space will be described hereinafter, it being possible for the movement itself to be three-dimensional, and it will be accepted that the positions in the two-dimensional space are all defined in the same manner by a pair of items of position information for each point or object. It is known, in fact, to process items of position information so that they are all of the same nature and defined with respect to the same system of co-ordinates.

More precisely, the invention relates to the representation of the movement of a moving body on board this body for the purposes of facilitating the piloting of the same, in particular for ships and fishing boats, to which reference will be made hereinafter to explain the invention more clearly. It should be understood, however, that the invention applies in a much more general manner.

Plotters or plotting tables permitting visual display of the movement and/or the position of a moving body, such as a ship, relative to a geographical map background chosen at will are already known.

The important parts of such apparatus are the mechanical drive, the plotting instrument and the support paper for the plot and/or the map. Obtaining satisfactory co-operation of these parts is a matter involving problems, especially when good precision and good reliability of operation are desired.

In fact, the map background is rich in various kinds of information represented with great accuracy and it is important that the plotting mechanism and the plot obtained should have the same characteristics of accuracy. This leads to devices with a sophisticated technology and which are rather complex and generally bulky.

A major drawback of plotters and plotting tables is the lack of flexibility. In fact, the map background has fixed dimensions which do not permit a change of scale at will in a simple manner; above all, it is still necessary to make a periodical change of map. This causes the appearance of a problem of correct positioning of the map in order that the reference point of the plot may be fixed in a manner compatible with the accuracy of the map and the mechanical characteristics of the plotting table.

Also known are radar screens which provide a visual display of information on the position of objects with respect to the moving body. These radar screens, however, are dependent upon the method employed: only objects capable of sending back an echo in response to an electromagnetic wave are represented. It is known that interpretation of the images obtained on a radar screen is often critical and requires the intervention of a specialist.

Where ships are concerned, there is a risk of certain flat and sandy coasts failing to appear, while a relief located in the interior of the land may seem to mark the coast; moreover, obstacles on the bottom do not appear. In fact, it is possible to place a reflector, easily identifiable on a radar screen, at chosen points. Such an arrangement, however, is obviously applicable only in a limited manner.

Uncertainty as to the location of the coast and failure to recognize obstacles on the bottom are major drawbacks for navigation and obstacles on the bottom are a source of serious damage to trawls for fishing boats of the trawler type.

The essential object of the present invention is to supply the pilot of a moving body with a representation of the relative positions of the moving body and of the datum or reference points or obstacles, so that this representation may be able to serve by itself as a basis for the piloting of the moving body along any desired course.

Another object of the invention is to provide a representation of this kind which is very flexible and which in particular permits easy production of changes of scale.

A further object of the invention is to provide a representation of this kind in which the reference point of the positions can be changed easily in accordance with requirements without loss of accuracy of the representation.

Means giving the position of a moving body accurately are normally available. For boats or ships, these means may be constituted by navigation equipment of all types, in particular radionavigation equipment. It is also known to convert the items of information supplied by such equipment into pairs of items of information in two dimensions comparable to those of a geographical map.

The Applicants have observed that in general users also known the positions of the reference points, the obstacles and any other objects coming into navigation.

The problem that the user has therefore consists in piloting the moving body whose position is known while taking account of the position of reference points, obstacles and other objects.

According to the invention, there is proposed to this end a method of representing the movement of a moving body from a pair of items of information giving the current position of the moving body, the representation being effected on the screen of a cathode tube associated with a circuit having two spot-position control inputs and advantageously a gated control input.

By pair of items of information giving the current position of the moving body there is understood a pair of items of information which are supplied permanently, for example by a navigation apparatus, it being possible for this information to be already in sampled form. In the latter case, it is necessary for the sampling frequency to be sufficiently fast to preserve the accuracy desired for the representation.

The method according to the invention consists on the one hand in:

storing a plurality of pairs of items of information giving positions of reference points, which are referred to the same two-dimensional space as the items of information giving the current position of the moving body, storing from time to time the pair of items of information giving the current position of the moving body, keeping in store only a limited number of such items of information as past positions, and, on the other hand, in repetitive fashion, in:

extracting in succession each pair of items of position information in the group comprising the pairs of items of information giving the position of reference points which have been stored, the pairs of items of information giving the position of the moving body which have been stored as past positions, and the pair of items of information giving the current position of the moving body, producing in succession pairs of items of relative-position information, by difference between the two items of information of each successive pair of items of position information extracted from the said group and the two items of information of a predetermined pair of items of position information of the said group, respectively, producing in succession pairs of analogue signals respectively representing at least parts of the two items of information of each successive pair of items of relative-position information, applying in succession each pair of analogue signals respectively to the two spot-position control inputs of the circuit of the cathode tube.

This supplies a representation of the current, or present, position and the past positions of the moving body and also of the positions of reference points. In fact, the persistence of the luminous impressions on the cathode tube for the human eye gives an apparent simultaneity to the successively controlled positions of the spot.

It is advantageous that the period of storage of items of information giving the current position of the moving body as items of past-position information be large with respect to the duration of each of the successive extractions of a pair of items of position information in the aforesaid group.

The production of pairs of analogue signals is effected with great advantage from less significant parts of the two items of relative-position information of each successive pair and the method moreover comprises the operation consisting in applying an inhibiting signal to the spot-appearance control input, at the same time as the two analogue signals of each pair, when at least one of the two items of relative-position information constituting the pair used for producing such pair of analogue signals has a non-zero more significant part.

By "less significant parts of items of position information" there is understood, in known manner, the part corresponding to the remainder obtained in the division of the relative-position quantities by a predetermined value, called the modulo of the less significant parts. The quotient of the said division is called the "more significant part of the items of position information". Of course, the items of position information have a known precision. It is not necessary for combination of the less significant and more significant parts to give a precision equal to that of the items of position information.

As a variant, the method also comprises the operation consisting in storing in repetitive fashion the pair of items of information giving the current position of the moving body, the rate of repetition of this storage being of the order of magnitude of the frequency of extraction of a given pair of items of position information in the said group of pairs of items of opsition information, the said extraction consisting, as regards the pair of items of information giving the current position of the moving body, in extracting the pair of items of position information stored in this way.

The invention also relates to electronic arrangements for carrying the above methods into effect.

An electronic arrangement for representing the movement of a moving body in accordance with the invention from a pair of items of information giving the current position of the moving body and referred to a two-dimensional space comprises:

an addressable read-write storage circuit adapted to receive and supply pairs of items of position information, a monitor circuit adapted, on the one hand, to command in succession and in cyclic fashion the extraction of each of the pairs of items of position information of the group comprising the stored pairs of items of position information and the pair of items of information giving the current position of the moving body, and, on the other hand, to command at given instants the writing, in a part of the storage circuit, of the pair of items of information giving the current position of the moving body, as past positions, and to write pairs of items of information giving the position of selected reference points in controlled fashion in another part of the storage circuit, a digital subtractor circuit for supplying successive pairs of items of relative-position information by forming the difference between the two items of information of each successively extracted pair of items of position information and the two items of position information of a predetermined pair of items of position information of the said group, respectively, a circuit for producing successive pairs of analogue signals respectively representing at least parts of the two items of relative-position information of each successive pair of such items, and a cathode tube circuit having two spot-position control inputs respectively receiving the two analogue signals of each successive pair.

Other characteristics and advantages of the invention will appear on reading the following detailed description given with reference to the accompanying drawings given by way of non-limitative example and in which:

FIG. 4 is a detailed diagram of a first embodiment of the analogue signal generating circuit 6 of FIG. 1;

FIG. 6 is a graph illustrating the role of the complementing of the most significant bit before digital-to-analogue conversion as in FIGS. 4 and 5.

The invention may be carried into effect with items of position information of different natures. In particular, it is known to represent an item of numeric information either in the form of bits (fixed numeric form), or in the form of a frequency the value of which is linked linearly to the numeric value to be represented (time-linked numeric form), In the continuation of the present detailed description, it will be assumed for simplicity that the items of numeric information are all expressed in the form of bits, in pure binary code, and that the various items of position information used comprise 20 bits.

Each pair of items of position information comprises a first co-ordinate designated by the co-ordinate X and a second co-ordinate designated by the refernece Y. It is clear that the devices assigned to the co-ordinates X and to the co-ordinate Y, respectively, play the same part. It is for this reason that the detailed diagrams of FIGS. 2 and 4 to 6 relate only to the co-ordinate X.

Figure 1:
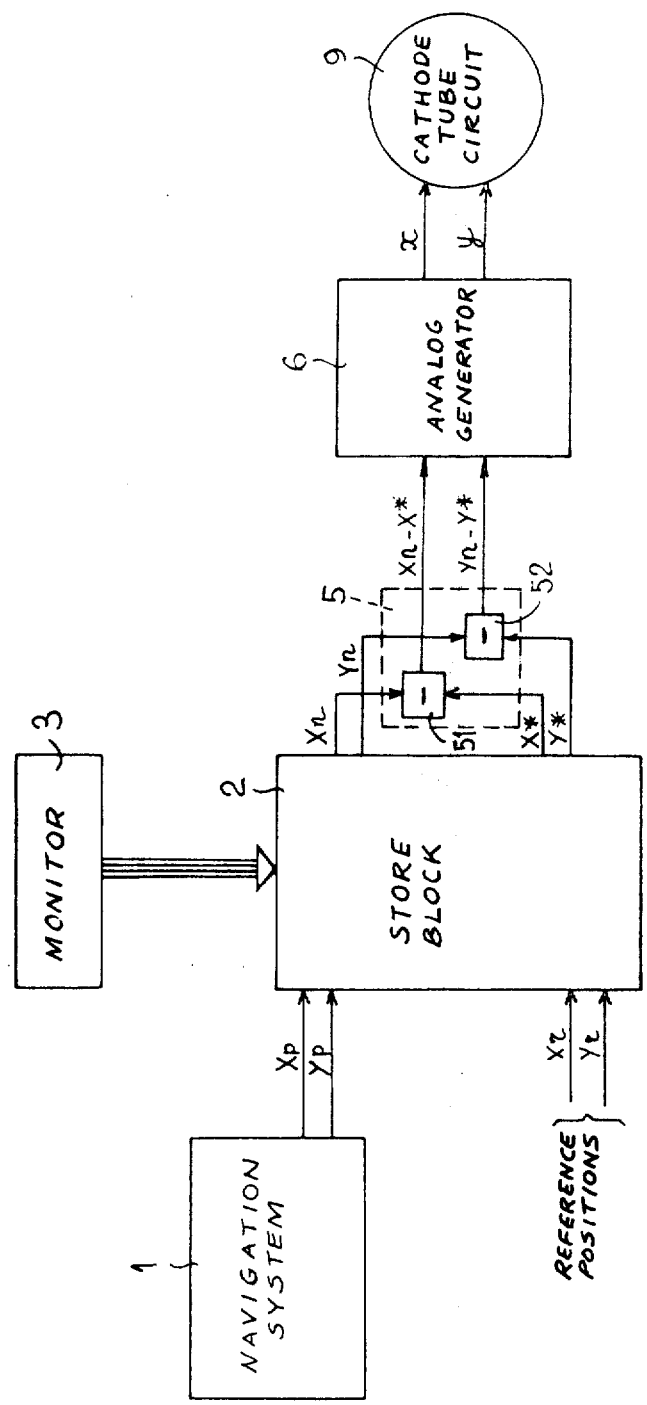
FIG. 1 is a basic circuit diagram of an electronic arrangement according to the invention for carrying the above-mentioned method into effect.

FIG. 1 shown a navigation system 1 which supplies in real time information relating to the current position of the moving body, either in continuous form or in sampled form. It will be assumed for simplification that the system 1 supplies directly at any instant a pair of items of position information comprising 20 binary bits for each co-ordinate $X_p$ and $Y_p$.

Pairs of items of information giving, or relating to, the position of reference points are supplied successively at the inputs $X_r$ and $X_r$, for example by manual entry, as will be seen hereinafter.

In the embodiment illustrated, all the items of position information are introduced into the store block 2 in a manner controlled by a monitor circuit 3.

The monitor 3 commands, on the one hand, the selection of a predetermined pair of items of position information $X^*$ and $Y^*$ which serve as a reference for producing the items of relative-position information, and, on the other hand, the successive extraction or reading of all the pairs of items of position information recorded in the store 2. Each successive pair read is designated by the current variables $X_n$ and $Y_n$.

The two corresponding items of information of each successive pair read and of the reference pair are subtracted in a binary digital subtractor circuit 5 to obtain respectively $X_n - X^*$ in the subtractor 51 and $Y_n - Y^*$ in the subtractor 52.

The respective outputs of the subtractors 51 and 52 of the subtractor circuit 5 are applied to a circuit 6 generating a pair of analogue signals $x$ and $y$. The analogue signals $x$ and $y$ are applied to the two spot-position control inputs of the cathode tube circuit 9.

The store block 2 and the monitor circuit 3 will now be described with reference to FIGS. 2 and 3.

The store block 2 comprises, for the co-ordinate X, four read-write store units, each unit being adapted to receive 16 co-ordinates or words of 20 bits each. These four store units bear the references 21 to 24, respectively; each unit may comprise, for example, five integrated circuits of type SN7489 (TEXAS INSTRUMENTS). These five integrated circuits are interconnected, in a manner known to those skilled in the art, so that a single item of address information is sufficient in each store unit.

Consequently, the address in each store unit such as 21 comprises 4 bits, which are designated by the references A, B, C and D. Each store unit moreover comprises an activating input ME, which permits reading, and also writing when the writing activating input WE is also energized. In other words, the lines ME1 to ME4 achieve the addressing of the store units 21 to 24, respectively. Moreover, each store unit such as 21 comprises an input for co-ordinates (20 bits) and an output for co-ordinates (20 bits).

The store block moreover comprises two auxiliary stores 25 and 26 each taking 20 bits. These auxiliary stores are, for example, digital samplers.

The input of the store unit 21 receives the co-ordinate $X_p$ supplied by the navigation system 1 (FIG. 1) to represent the current position of the moving body. In the embodiment illustrated in FIG. 2, the inputs of the store units 21 to 24 are connected in common bit by bit to form a plurality of input lines for the reference-point position $X_r$ which are connected, for example, to manual entry means (not shown) for 20-bit binary co-ordinates.

The outputs of the store units 21 to 24 are connected in common bit by bit to supply, according to the current address, the current co-ordinate $X_n$ and, at a predetermined address, the relative-position reference co-ordinate $X^*$, applied to the auxiliary store 25. Likewise, they supply the position co-ordinate of a reference point addressed for the purpose of writing through the medium of another auxiliary store or sampler 26, for purposes which will be described hereinafter.

Figure 2:
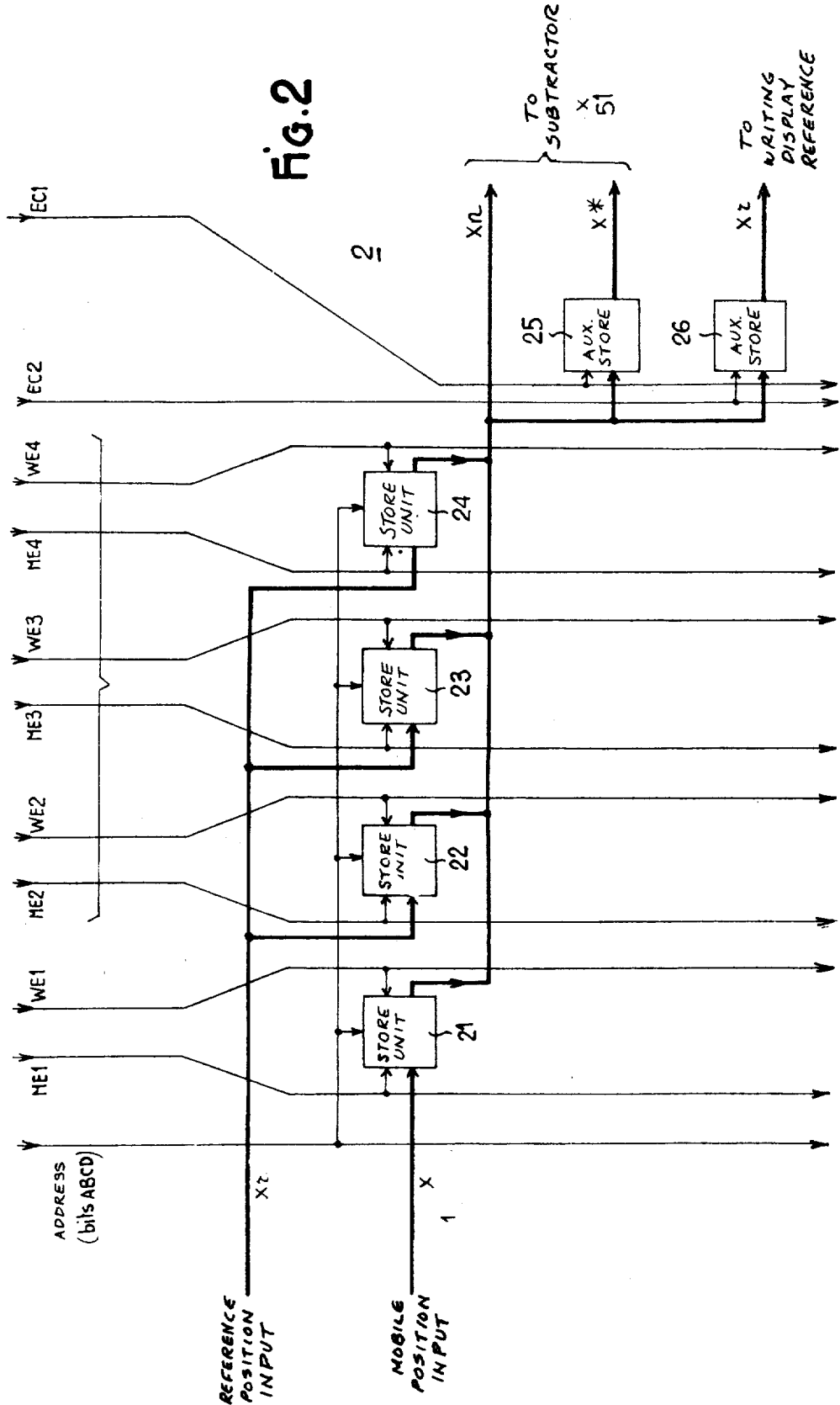
FIG. 2 is a partially detailed circuit diagram of the stores block 2 of FIG. 1.

All the command lines in FIG. 2 coming from the monitor 3 from the top of the Figure are continued towards the bottom of the same to show the store block comprises another identical part for the second co-ordinate Y.

Figure 3:
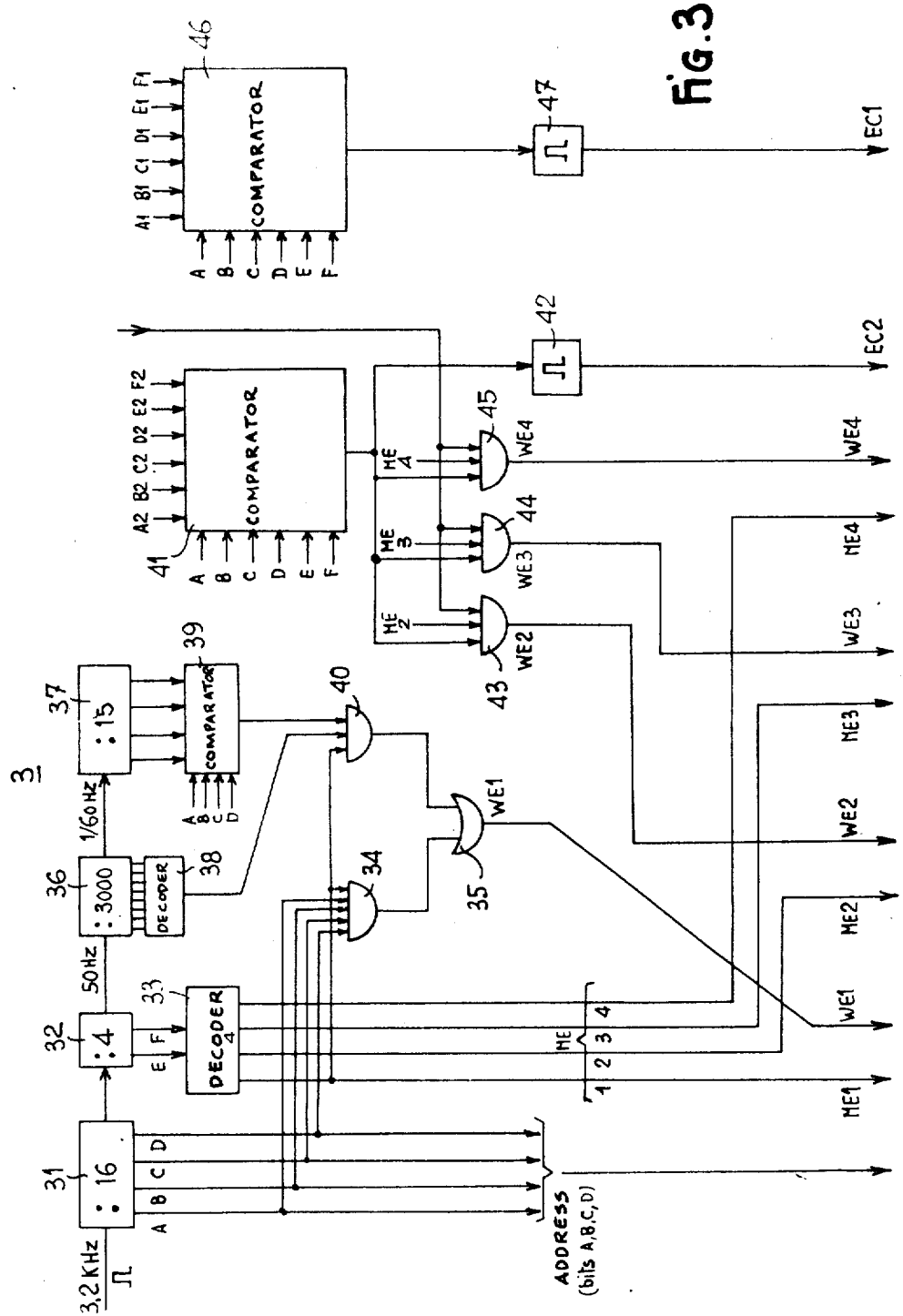
FIG. 3 is the detailed circuit diagram of the monitor block 3 of FIG. 1.

The monitor circuit 3 of FIG. 3 comprises a source of clock pulses (not shown) with a frequency of 3.2 kHz. The clock pulses are applied to a divide-by-16 counter 31, the four successive-stage outputs of which are designated by the references A, B, C, D and constitute the common address information for the store units 21 to 24 of FIG. 2 (co-ordinate X) and the identical store units (not shown) for the co-ordinate Y.

The divided output of the counter 31 is applied to a divide-by-4 counter 32, the outputs of which through stages E and F are applied to a decoder 33 having four outputs designated by the references ME1 to ME4 and applied to the store units 21 to 24, respectively, and to their equivalents in the case of the co-ordinate Y.

The address of a pair of items of position information in the store block 2 is completely defined with the aid of the four address bits A, B, C, D and of the energization of one of the lines ME1 to ME4. The address is also completely defined by the six address bits A, B, C, D, E, F.

As indicated hereinbefore, the store unit 21, and its counterpart or equivalent in the case of the co-ordinate Y, are assigned to the storage of the pairs of items of information giving past positions of the moving body. In the embodiment described, the pair of items of information giving the current position of the moving body is also the subject of storage in this place. This storage is effected in the store location corresponding to the values 1 for each of the bits A, B, C, D and on energization of the line ME1, all these lines being connected to an AND gate 34 the output of which is applied to an OR gate 35 to form a command on the writing activating line WE1. Consequently, each time the store location "present position of the moving body" is addressed, reading of the pair of items of present or current position information takes place at the same time as the writing of a new pair of items of current position information.

Moreover, the divided output of the counter 32 supplies pulses at 50 Hz which are applied to a divide-by-3000 counter 36, the divided output of which supplies pulses at 1/60 Hz which are applied to a divide-by-15 counter 37. Stage outputs of the counter 36 are partially decoded in a circuit 38 to supply every minute a pulse with a duration of 1/50 second.

The four stage outputs of the counter 37 are compared in a digital comparator 39 with the four outputs A, B, C, D of the counter 31, the comparator 39 supplying a 1 level in the case of coincidence. The outputs of the comparator 39, the circuit 38 and the line ME1 are applied to an AND gate 40, the output of which constitutes the other input of the OR gate 35 connected to the line WE1.

In this way, the current position of the moving body is recorded every minute in a store location of the unit 21 (and of its counterpart in the case of Y), each time with a different address controlled by the counter 37. Of course, every 15 minutes the past-position information which is present in a store location is replaced by fresher information.

There now be described a method of effecting the storage of the items of information giving the position of reference points, in which this storage can be effected in successive fashion for each position.

A compressor 41 receives, on the one hand, the stage outputs A, B, C, D of the counter 31 and the stage outputs E, F of the counter 32, and, on the other hand, items of corresponding binary information A2 to F2 adjustable by manual entry by the user. The output of the comparator 41, which is energized in the case of coincidence of the entered address with the complete store address, is applied to a circuit 42 of the monostable type supplying a pulse which is applied on the line EC2 to the auxiliary store or sampler 26 of FIG. 2.

Consequently, at the instant when coincidence of address occurs in the comparator 41, the pair of co-ordinates $X_r$ and $Y_r$ of the reference point addressed is recorded in the auxiliary store 26 and its counterpart, for the purpose of display by display means (not shown) for the addressed reference-point position. This enables the user to read the value stored, before or after modification.

The output of the comparator 41 and a line for writing command by the user are both connected to each of the AND gates 43, 44 and 45, which moreover receive the output lines ME2, ME3 and ME4, respectively, of the decoder 33. The outputs of the gates 43, 44 and 45 respectively supply the writing activating lines WE2 for the store unit 22 (and its counterpart for Y), WE3 for the store unit 23 (and its counterpart for Y), and WE4 for the store unit 24 (and its counterpart for Y).

Consequently, the user enters (on means not shown) 20 bits for the co-ordinate $X_r$ and 20 bits for the co-ordinate $Y_r$ of the new reference point to be stored. The storage address is that corresponding to the pre-adjusted inputs of the comparator 41 and the storage is effected in response to a writing command signal supplied, for example, by a push button (not shown), which has the effect of producing a writing activating signal in the store unit corresponding to the pre-adjusted complete address by means of one of the gates 43 to 45, while the address in this unit is defined by the coincidence of the part A2, B2, C2 and D2 of the pre-adjusted address with the outputs of stages A, B, C, D of the counter 31.

In the embodiment described, the pair of items of position information which is used as a reference for the relative positions is adjustable by means of a comparator 46 connected like the comparator 41, but with separate pre-adjustment for a different complete address A1, B1, C1, D1, E1, F1. The output of the comparator 46 is applied to a circuit 47 of the monostable type generating a command pulse for the auxiliary store 25 for the reference co-ordinate $X^*$ and for the counterpart of this store for the co-ordinate $Y^*$. IT will be seen that the reference pair is "revived" at each cycle of the counters 31 and 32, taken together.

As a variant, it is possible to establish by construction that the reference position be the current position of the moving body. It is then possible to eliminate the auxiliary store 25 by applying the outputs $X_p$ and $Y_p$ of the navigation system directly as inputs $X^*$ and $Y^*$ of the subtractor circuit 5. Preferably, a circuit commanded by the monitor at a special address enables the reference information to be applied at each reading cycle to the two inputs of each subtractor, which enables the reference point to be visually displayed.

The special address may be supplied by the output of the AND/gate 34. The OR gate 35 is replaced by a direct connection of the output of the AND gate 40 to the line WE1.

The comparator 46, the circuit 47 and the control line EC1 are unnecessary for the varient which has just been described and may be omitted.

It is apparent from the foregoing description that the input of the subtractor circuit 5 of FIG. 1 receives, on the one hand, a predetermined item of position information ($X^*$, $Y^*$) which serves as a reference for determining the relative positions, and, on the other hand, in succession, each of the items of information present in the store block 2, including $X^*$, $Y^*$. It is important to observe that, in accordance with FIGS. 2 and 3 and the description thereof which has been given, all the items of information present in the store units 21 to 24 and their counterparts for the co-ordinate Y respond in exactly the same way to the application of a complete address as regards reading. On the other hand, it has been seen that writing in the various store units is effected in a different manner according to whether it is a question of the current position of the moving body, the past positions of the moving body or the reference-point positions.

In the embodiment hereinbefore described, the items of information giving the position of reference points are introduced one by one. This is therefore a question of items of position information which are set, but can be modified from time to time. Of course, the words "reference point" should not be understood as a limitation and they designate any object whose position may have an importance for the piloting of the moving body in question. In other words, the term "information giving the position of reference points" denotes any position information likely to be useful for piloting a moving body. In this respect, it is perfectly possible to apply the invention when some of the reference points are movable by re-storing the corresponding information at a sufficiently rapid frequency.

The subtractor circuit 5 of FIG. 1 comprises, for each co-ordinate, a 20-bit binary digital subtractor circuit which may be of the parallel type.

The two subtractors function in the same way. Only the co-ordinate X will be considered in the following, since all the remainder of the circuit of FIG. 1 is symmetrical.

The digital subtractor 51 may be an algebraic subtractor, that is to say it may be capable of supplying digital output information of one sign or the other. In an interesting variant, each subtractor circuit comprises a circuit for complementing each of the bits of one of the items of information to be subtracted, for example the reference position information X*, Y*. In this case, the other item of information is applied to a normal adder to be added to the output of the complementing circuit.

When all the bits are complemented, the restricted complement is obtained, which is inexact as regards the least significant bit. The corresponding error can most often be disregarded. If not, the true complement can be constructed.

The output of the digital subtractor 51 therefore comprises 20 bits. If the output information is positive, it is obtained directly. If it is negative, it is obtained in the form of the complement to $2^{20}$ of its absolute value.

FIG. 4 shows a first embodiment of the circuit 6 for generating analogue signals from the items of relative-position information $X_n - X^*$ and $Y_n - Y^*$. The circuit shown concerns only the co-ordinate $X_n - X^*$.

This item of information $X_n - X^*$ comprising 20 bits is applied to a digital-to-analogue converter circuit 61. The circuit 61 comprises in the first place an inverter 610 for the bit of highest weight.

In effect, the output of the subtractor 51 varies as indicated in solid lines in FIG. 6, namely from $2^{19}$ to $2^{20}$ for a negative item of position information from $-2^{19}$ to 0, while it varies from zero to $2^{19}$ for an item of position information from zero to $+2^{19}$. The inverter 610 permits obtainment of the signal represented in the dash line, which varies from 0 to $2^{20}$ when the item of relative-position information supplied by the subtractor 51 ranges from $-2^{19}$ to $+2^{19}$. It may therefore be considered that the bit applied to the inverter 610 also plays the part of a sign bit.

The information obtained in this way then forms the subject of a conventional digital-to-analogue conversion for digital signals of the same sign by means of a plurality of relay amplifiers 611 all identical and each receiving one of the bits. The outputs of the plurality of amplifiers 611 are respectively applied to a plurality of resistors 612, the values of which are balanced in accordance with a binary law in manner known per se.

The amplifiers 611 permit an adaptation of the logical output levels of the subtractor for use in the resistor network 612. They are of the type supplying a ZERO or ONE output state in response to a ZERO or ONE input state, the ONE output level corresponding to a precisely known analogue voltage and the ZERO output level being very close to earth voltage.

The outputs of the plurality of resistors 612 are all connected in common to be applied through the medium of a resistor 622 to a differential amplifier 621, these two elements forming part of an amplifying circuit 62. The output of the amplifier 621 is connected to its input through a potentiometer 623 for adjustment of the amplification factor.

The reference amplification voltage applied to the + input of the amplifier 621 is adjustable between 0 and 10 volts by means of a potentiometer 624.

The output of the amplifier 621 is applied through the medium of a resistor 625 to a deflecting coil 91 of the cathode tube 9. The other end of the coil 91 receives a voltage of +5 volts.

In this way, the position of the spot of the cathode tube 9 is controlled by the current signal $x$ passing through the coil 91, this signal being proportional to the difference between the reference signal applied to the + input of the amplifier 621 and the analogue signal applied to the − input of the said amplifier 621.

This analogue signal applied to the − input of the amplifier 621 is itself proportional to the value of the item of digital relative-position information supplied by the output of the subtractor 51.

The potentiometer 624 permits adjustment of the framing in the direction $x$. The potentiometer 623 permits adjustment of the scale in the direction $x$. Of course, for all those values of the analogue signal appearing at the input of the amplifier 621 and which produce in the coil 91 a current $x$ exceeding a characteristic value of the cathode tube circuit no image appears on the screen of the tube. Consequently, at least a part of the items of relative-position information actually forms the subject of a representation.

A coil for deflection $y$, bearing the reference 92 in FIG. 4, is controlled in the same manner, but from the digital output of the subtractor 52.

Figure 5:
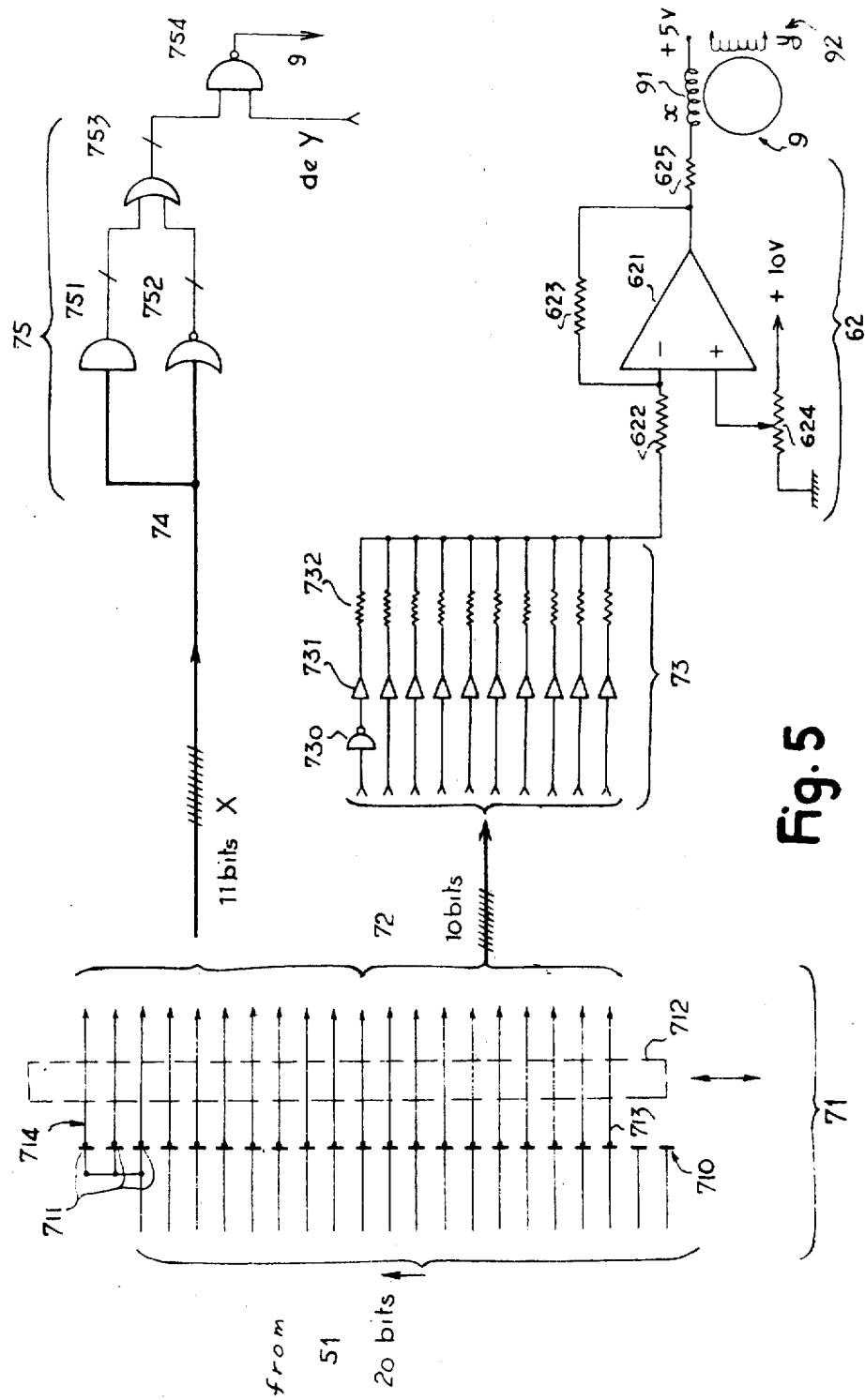
FIG. 5 is a detailed diagram of a second embodiment of the circuit 6 of FIG. 1.

FIG. 5 illustrates another embodiment of the analogue signal generating circuit 6 of FIG. 1.

In FIG. 5, the differential amplifier 62 which supplies a current signal $x$ to the cathode tube 9 for magnetic deflection by means of a coil 91 is identical to the amplifier of FIG. 4, except that the resistor 623 may have a fixed value. In fact, the adjustment of the scale is effected in a manner different to that described in the case of FIG. 4.

On the left of FIG. 5 there are shown the 20 output lines of the subtractor 51, for 20 bits, the binary weights increasing towards the top of the drawing. Each of these lines terminates at a contact illustrated diagrammatically by a small transverse stroke. These contacts, such as 710, form part of a switching circuit 71 which enables the scale to be changed. The line corresponding to the bit of greatest weight is associated with a plurality of contacts 711.

To facilitate explanation, it will be assumed that the contacts such as 710 and 711 are fixed. An insulating support 712 carries 20 electric conductors such as 713 and 714, which are compelled to remain in contact with 20 adjacent contacts of the plurality of contacts.

The support 712 therefore enables all the connections of one or more bits to be shifted in the direction of the higher or lower weights. This shifting produces a change of scale.

Of course, this representation of the switching circuit is diagrammatic and it is considered as being easy for those skilled in the art to devise other constructional forms.

The 10 lines of lower weight of the output of the switching circuit 71, which are designated by the reference 72, are connected to a digital-to-analogue converter circuit 73 constructed in a similar manner to the circuit 61 of FIG. 4, but operating only for 10 bits.

The converter circuit 73 comprises an inverter 730 for the bit of top weight, which also plays the part of a sign bit, a plurality of relay amplifiers 731 and a plurality of resistors 732 balanced in accordance with a binary law. The outputs of the resistors 732 are all connected in common and to the resistor 622.

The digital-to-analogue converter 73 operates like the converter 61, but only for 10 consecutive bits of the item of relative-position information supplied by the output of the subtractor 51.

The role of the inverter 730 is again the same as that illustrated in FIG. 6 for the inverter 610, namely to enable continuous analogue information to be obtained when the input information of the converter 73 varies from $-2^9$ to $+2^9$, the value $2^9$ being assigned in this latter case to the smallest weight of the converter, that is to say to the line 713.

If the output of the converter on the cathode tube side is now considered, the resistor 623 (FIG. 5) is normally chosen such that a substantial part of the range of the analogue signals capable of being supplied by the converter gives rise to the appearance of a spot on the screen, taking into account the possibility of modifying the framing by means of the potentiometer 624.

In fact, the "zero" of the range of the bits forming the subject of a digital-to-analogue conversion and the zero of the range of the analogue signals obtained are situated in the middle of these ranges, when, for technological reasons, the negative digital information is in complement form and the analogue signals are of a single polarity.

This definition of the "zero" of the analogue signals is compatible with the operation of the cathode tube, since the deflection of the spot is effected to both sides of a median position adjustable by the potentiometer 624.

This justifies the top bit of the converter applied to the inverter 730 being regarded, on the one hand, as bearing digital information for digital-to-analogue conversion and, on the other hand, as bearing sign information in regard to the deflection of the spot.

With the method of conversion of FIG. 5, which makes use only of the less significant output bits of the switching circuit 71, a visible spot would be obtained for all the items of position information stored, even when the other bits of these items of information indicate that the spot would be bound to leave the screen of the cathode tube 9.

The less significant part of the items of relative-position information is constituted by the 10 bits of lower weight forming the subject of the digital-to-analogue conversion. In FIG. 5, these ten bits correspond to the ten lines beginning with the line 713 and proceeding upwards. It can be seen that the last two bits (710 and the adjacent line) of the item of relative-position information coming from the subtractor 51 are not used.

The applicants have observed that the ten bits forming the less significant part should be used for controlling the spot of the cathode tube only if the more significant part is completely zero. This more significant part comprises in principle all the bits of a weight higher than that of the line 730.

The idea of less significant part and more significant part has been considered up to now for algebraic numbers having a sign. In the embodiment described, the negative sign has been replaced by complementing.

The Applicants have established that the spot should appear on the screen only when all the bits of the more significant part are at 0 (non-complemented positive quantity), or when all the bits are at 1 (complemented negative quantity).

Moreover, the bit of greatest weight of the less significant part carries the sign information. In fact, if the appearance of the graph of FIG. 6 is considered again, the bit of greatest weight enables the negative values to be identified when it is at 1. Thus, this bit should be compared with the bits of the more significant part for commanding spot inhibition.

The 10 bits of the more significant part and the bit of greatest weight of the less significant part are therefore assembled in a plurality of lines 74 to go to the spot-inhibiting logic circuit 75.

In this embodiment and with the position of the switching circuit 71 which is shown in FIG. 5, the 3 bits of greatest weight of the output of the switching circuit 71 are taken all together from the bit of greatest weight of the input of the switching circuit. This is due to the fact that the output of the switching circuit must comprise 20 connections in all, even when the selected bits are shifted with respect to those of the input, for reasons of wiring of the inhibiting logic circuit. It is therefore important to create as many supplementary contacts such as 711 as there are possible shifts in the switching circuit 71. In this way there are obtained eleven lines for bits of X leading to the inhibiting logic circuit 75.

In similar fashion there are obtained the eleven bits of the information Y, which are the bits of greatest weight issuing from a switching circuit similar to the circuit 71.

The eleven X lines, bearing the reference 74, are all connected together to an AND gate 751 having eleven inputs and to a NOR gate 752 having eleven inputs. The AND gate 751 supplies a ONE signal when the 10 bits of the more significant part are at 1 at the same time as the top bit of the less significant part, which corresponds to a less significant part considered as negatiive (complemented) at the level of the converter 73 and associated with a zero more significant part.

The NOR gate 752 supplies a ONE output signal when the 10 bits of the more significant part are at 0 (zero) at the same time as the top bit of the less significant part, which corresponds to a less significant part considered as positive (non-complemented) at the level of the converter 73 and associated with a 0 more significant part.

The outputs of the gates 751 and 752 are applied to a two-input OR gate 753 which supplies a ONE output signal when the position information in X has a zero more significant part.

The output of the gate 753 and the output of the similar gate for the information Y are combined in a NAND gate 754, Which supplies a spot inhibiting signal at ONE level when at least one of the items of position information of the pair has a non-zero more significant part.

The spot-inhibiting signal from the gate 754 is applied, for example, to the Wehnelt electrode (not shown) of the cathode tube 9 with the appropriate polarity, or in any other manner capable of preventing the appearance of the spot, by deflecting it, for example, beyond the useful area of the screen of the cathode tube.

Of course, the circuit 75 as illustrated is only a diagrammatic representation of the gates 751 and 752. It is an easy matter for those skilled in the art to produce such a circuit with gates having a smaller number of inputs, interconnected in suitable manner.

Generally speaking, it is clear that those skilled in the art can produce many variants of the embodiments of the invention which have been described hereinbefore; in particular, the part comprising the logic and/or digital circuits and storage circuits offers a very large number of possible variants. The realization of the functions of these circuits in unwired logic does not depart from the methods and arrangements according to the invention. As regards these methods and arrangements, the word "circuit" is used in the present description and the claims without prejudging anything as regards the material permanence of the connections between the various elements of each circuit and between the different circuits.

The different embodiments of the invention which have just been described permit the representation on the screen of the cathode tube of the positions of reference points, the current position of the moving body and past positions of the moving body taken at regular intervals of time, which causes the speed of the moving body to become evident. The past positions of the moving body may be chosen in accordance with a criterion other than the elapse of time; it is then difficult, however, to appreciate the speed from the representation on the screen.

The choice of the relative position reference enables the image to be fixed with respect to any one of the items of position information, that is to say either with respect to the current position of the moving body, or with respect to a past position of the moving body, or with respect to the position of a reference point. As indicated hereinbefore, the positions of reference points are of any nature (obstacles or other objects) and are not necessarily fixed.

The image may be framed in the direction $x$ and/or in the direction $y$ with the aid of the potentiometers 624 (FIGS. 4 and 5).

In the embodiment of FIG. 4, the change of scale of the representation is obtained by acting on the analogue signals by means of the potentiometer 623. In the embodiment of FIG. 5, the change of scale of the representation is obtained by acting on the switching apparatus such as 71. Of course, it is often advantageous to couple two potentiometers such as 623 (FIG. 4) or two switching circuits such as 71, to obtain a simultaneous change of scale in the direction $x$ and the direction $y$.

A very interesting variant of the invention consists in increasing the capacity of the store units such as 21 to 24 of FIG. 2 by one or more bits, the addressing and read-write system remaining the same. These supplementary bits do not contain numeric information, but purely logical information which is used in accordance with a suitable code in circuits (not shown) for commanding a modification of the appearance of the light spot. Thus, for example, it is advantageous to change the brilliance or the apparent diameter of the light spot so that the user can easily distinguish the current position of the moving body, on the one hand, the past positions of the moving body, on the other hand, and finally, moreover, the positions of the reference points. Of course, it is also very useful to distinguish certain types of reference points from one another. In particular, in the case of boats or ships, it is important to make a distinction between flush rocks, the coast and obstacles on the bottom.

At the beginning of the detailed description it is clearly stated that the items of information relating to position may be put into different forms without thereby departing from the scope of the invention. It is moreover possible to change the coding of the items of position information within the devices described. It is convenient, for example, for the user to work with displays in binary coded decimal notation, whereas the processing of the information is simpler in pure binary code, as described hereinbefore.

As regards the relation between the items of position information and the positions, this may be defined in particular in accordance with Cartesian co-ordinates (Lambert system, for example), geographical co-ordinates (longitude, latitude), hyperbolic co-ordinates of a radionavigation system, or again polar co-ordinates.

At the level of the cathode tube, it is advantageous for certain applications to provide a variable linear combination of the two spot-position control signals to obtain an orientation of the image at will.

We claim:

1. Method of representing the movement of a moving body on the screen of a cathode ray tube system having two spot-position control inputs, from a pair of items of information giving the current position of the moving body in a two-dimensional coordinate system, comprising the steps of:
    a. storing a plurality of pairs of items of information giving the position of reference points, in the same two-dimensional coordinate system,
    b. storing from time to time the pair of items of information giving the current position of the moving body, while eliminating the oldest stored pair, so as to keep in store only a limited number of such items of information,
    c. sequentially reading each pair of items of position information in the group comprising the pairs of items of said stored information giving the positions of reference points, the pairs of items of said stored information giving the position of the moving body, and the pair of items of information giving the current position of the moving body,
    d. sequentially subtracting each read pair of items of position information from a predetermined pair of items of information in said group, respectively, so as to obtain a pair of items of position information relative to the position corresponding to said predetermined pair,
    e. sequentially converting at least parts of the two items of information of each successive pair of items of relative-position information, into a pair of analogue signals, respectively,
    f. applying succession each pair of analogue signals respectively to the said two spot-position control inputs of the cathode ray tube system, and
    g. selectively repeating said steps c) through f), thereby providing a representation of the current position and the past positions of the moving body and of the positions of the reference points.

2. Method according to claim 1, wherein the cathode tube circuit has a gated control input, characterised in that the operation of producing analogue signals consists in producing each time two analogue signals respectively representing less significant parts of the two items of relative-position information of each successive pair, and in that it moreover comprises the operation consisting in applying an inhibiting signal to the control input, at the same time as the two analogue signals of each pair, when at least one of the two items of relative-position information of the pair used for producing such pair of analogue signals has a non-zero more significant part.

3. Method according to chain 1, characterised in that it moreover comprises the operation consisting in storing in repetitive fashion the pair of items of information giving the current position of the moving body, the rate of repetition of this storage being of the order of magnitude of the frequency of extraction of a given pair of items of position information in the said group of pairs of items of position information, the said extraction consisting, as regards the pair of items of information giving the current position of the moving body, in extracting the pair of items of position information stored in this way.

4. Electronic arrangement for representing the movement of a moving body by the method of claim 1 from a pair of items of information giving the current position of the moving body and referred to a two-dimensional space, characterised in that it comprises:
- an addressable read-write storage circuit adapted to receive and supply pairs of items of position information,
- a monitor circuit adapted, on the one hand, to command in succession and in cyclic fashion the extraction of each of the pairs of items of position information of the group comprising the stored pairs of items of position information and the pair of items of information giving the current position of the moving body, and, on the other hand, to command at given instants the writing, in a part of the storage circuit, of the pairs of items of information giving the current position of the moving body, as past position, and to write pairs of items of information giving the position of selected reference points in controlled fashion in another part of the storage circuit,
- a digital subtractor circuit for supplying successive pairs of items of relative-position information by forming the difference between the two items of information of each successively extracted pair of items of position information and the two items of position information of a predetermined pair of items of position information of the said group, respectively,
- a circuit for producing successive pairs of analogue signals respectively representing at least parts of the two items of relative-position information of each successive pair.
- and a cathode tube circuit having two spot-position control inputs respectively receiving the two analogue signals of each successive pair.

5. Electronic arrangement according to claim 4, characterised in that the analogue signal generating circuit comprises a digital-to-analogue converter circuit supplying the pair of analogue signals for all the items of relative-position information, the useful area of the screen of the cathode tube producing the representation from at least a part of the items of relative-position information.

6. Electronic arrangement according to claim 4, characterised in that the analogue signal generating circuit comprises a digital-to-analogue converter circuit supplying the pair of analogue signals for less significant parts of the items of relative-position information, and an inhibiting logic circuit adapted to supply an inhibiting signal when one of the items of relative-position information of each pair has a non-zero more significant part, and in that the cathode tube circuit comprises a spot inhibiting input receiving the said inhibiting signal.

7. Electronic arrangement according to claim 3 characterised in that the monitor circuit moreover comprises means for commanding in repetitive fashion the writing in store of the pair of items of information giving the current position of the moving body, the rate of repetition of this writing in store being of the order of magnitude of the frequency of reading of a given pair of items of position information, and in that it commands the reading of the pair of items of position information written in this way, as current position of the moving body, in the same way as for the other items of position information.

8. Electronic arrangement according to claim 4 characterised in that the storage circuit comprises an auxiliary store for the pair of items of information giving the reference-point position, and the monitor circuit comprises means for transferring a selected pair of items of position information as a pair of items of reference-point position information.

9. Electronic arrangement according to claim 6, wherein the items of information are digital, characterised in that the analogue signal generating circuit comprises a switching circuit for modifying in controlled manner the digital weights of the less significant parts of the two items of relative-position information of each pair, thereby permitting changes of scale.

* * * * *